Dec. 1, 1942.    E. L. HARDER    2,303,455
SUPERVISING ARRANGEMENT FOR RELAY SYSTEMS
Filed June 24, 1938
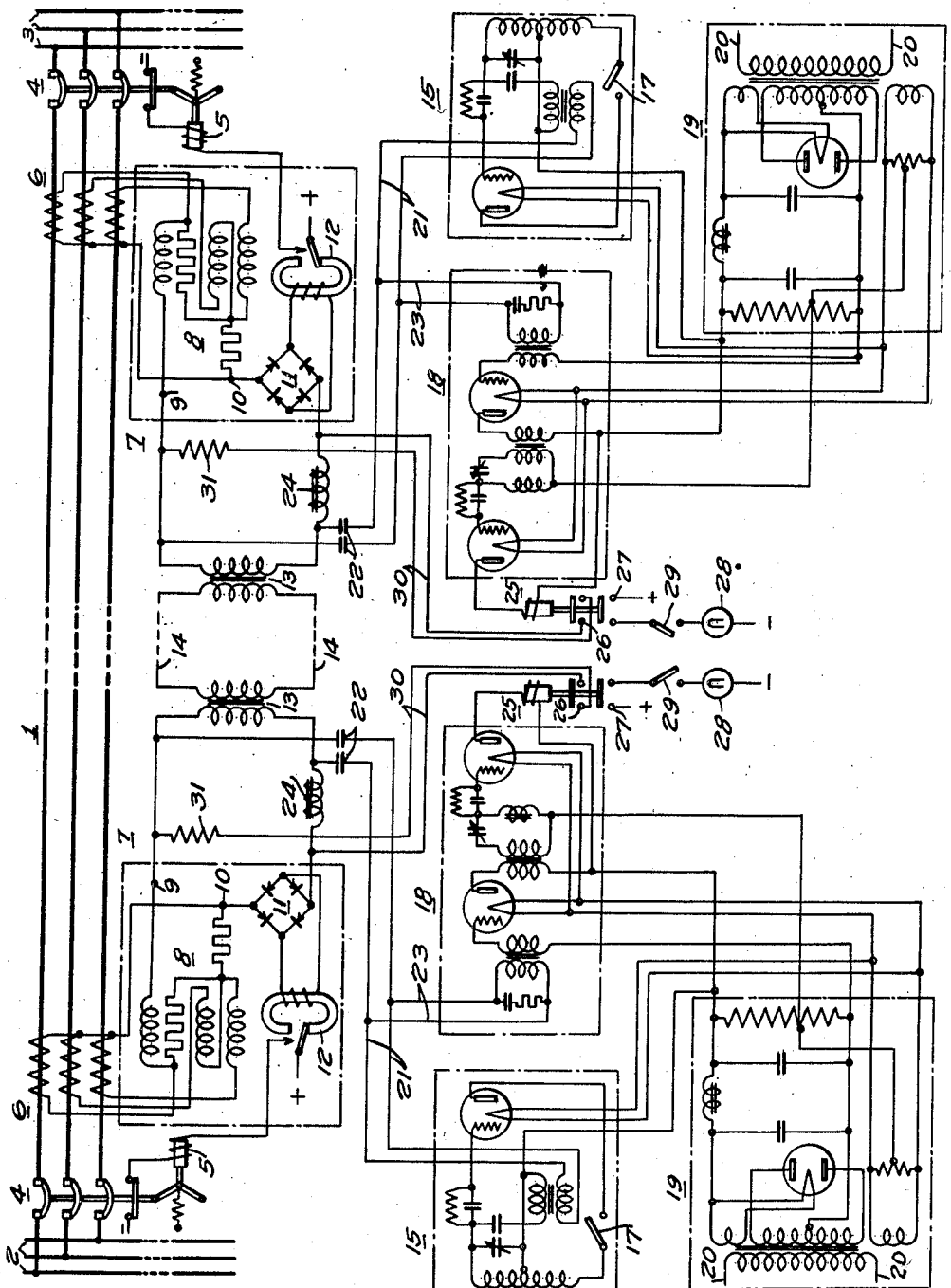
WITNESSES:
E. A. McCloskey.
F. P. Lyle
INVENTOR
Edwin L. Harder.
BY O. B. Buchanan
ATTORNEY Patented Dec. 1, 1942

2,303,455

UNITED STATES PATENT OFFICE 2,303,455

SUPERVISING ARRANGEMENT FOR RELAY SYSTEMS

Edwin L. Harder, Pittsburgh, Pa., assignor to Westinghouse Electric & Manufacturing Company, East Pittsburgh, Pa., a corporation of Pennsylvania Application June 24, 1938, Serial No. 215,534

1 Claim. (Cl. 175—294)

My invention relates to protective relay systems and, more particularly, to a supervising arrangement for pilot wires used in such systems.

Pilot wire relaying systems operate by comparing the line currents at opposite ends of a line section to be protected, which are equal and in phase when there is no fault in the section. In order to effect this comparison the relaying circuits at each end of the section are connected by pilot wires which extend from one end to the other.

Two general types of pilot wire systems are used, utilizing alternating current and direct current respectively in the pilot wires. The alternating-current systems may be of either the balanced voltage or the circulating current type. In the balanced voltage systems, equal and opposite voltages derived from the line currents at each end of a line section are balanced against each other through pilot wires, so that under normal load or through fault conditions no current flows in the pilot wires, while in case of an internal fault in the protected section, the voltages at opposite ends of the pilot wires become unequal so that a current flows through them and causes actuation of the relays. If the pilot wires become open circuited in a system of this type, it will not be detected and will prevent operation of the relays in case of an internal fault. In the circulating current systems, a current circulates in the pilot wires under normal conditions and is interrupted or changed in case of an internal fault in the protected section, thus causing actuation of the relays. In this type of system, short circuited pilot wires will not be detected and will prevent operation of the relays on internal faults.

The direct-current pilot wire systems use fault detector relays at opposite ends of the line section and depend upon the transmission of a blocking signal over the pilot wires to prevent operation of the relays on faults external to the protected section. Failure of the pilot wires, whether they are open circuited or short circuited, results in operation of the relays and tripping of the circuit breakers in case of an external fault because of failure of the blocking signal to be transmitted. This type of operation, in the event of a fault on the pilot wires, is desired in many cases, because it prevents affecting the back-up protection of other lines, which may extend over a wide area. In other words, it is considered preferable to trip the pilot relayed lines on external faults occurring while the pilot wires are faulted, provided that by so doing, internal faults in the protected line section will always be cleared promptly.

This gives the direct-current systems a certain advantage which is offset by many disadvantages. One of these is the difficulty of insulating the pilot wires from the terminal relay equipment. This difficulty is avoided in the alternating-current systems by using insulating transformers at the ends of the pilot wires, which also have the advantage of reducing the pilot wire current, and, therefore, the impedance drop. The use of insulating transformers also eliminates the difficulties encountered in the direct-current systems resulting from the differences in station ground potentials and the interconnection of different station batteries. The alternating-current schemes are also much simpler and faster than the direct-current schemes.

The object of the present invention, broadly stated, is to provide a supervising arrangement for an alternating-current pilot wire relaying system which will give it the desirable operating characteristics of the direct-current systems, while at the same time retaining the inherent advantages of the alternating-current system. A supervising arrangement for an alternating-current pilot wire relaying system is disclosed in my prior Patent No. 1,953,108, issued April 3, 1934, and assigned to Westinghouse Electric & Manufacturing Company. The system shown in this patent is applicable in certain cases, but it does not take advantage of the desirable properties of the insulating transformers, since it uses ground connections with batteries and relays connected on the line side of the insulating transformers.

Another object of the present invention, therefore, is to provide a supervising arrangement for an alternating-current pilot wire system in which no equipment is connected on the line side of the insulating transformers.

Still another object of the invention is to provide a supervising system for pilot wire relaying systems of any type which will effect a desired change in the characteristics of the relay equipment in the event of failure of the pilot wires, so that adequate protection will still be provided.

A further object is to provide a supervising system for pilot wires which will be free from failure due to loss of supply voltage under emergency operating conditions.

A further object of the invention is to provide a supervising system which is of general application to pilot wires for relay systems, or to similar auxiliary circuits, and which will either actuate an alarm or effect a desired change in the connections of the terminal equipment, or both, in case of failure of the pilot wires.

The invention will be more fully understood from the following detailed description taken in connection with the accompanying drawing, in which the single figure is a diagram of a pilot wire relaying system embodying the supervising arrangement of the present invention.

The invention is shown in the drawing as applied to a relaying system for the protection of a three-phase transmission line section 1 extending between buses 2 and 3, which may be located in different substations. A circuit breaker 4 having a trip coil 5 is provided at each end of the line section to disconnect it from the bus. Current transformers 6 are provided at each end of the section to measure the currents flowing in the line for relaying purposes.

The relaying equipment is identical at both ends of the section and will, therefore, be described in detail for one end only. The current transformers 6 are connected to a relaying circuit 7, which is preferably of the type shown in my copending application Serial No. 183,044, filed January 3, 1938, Patent No. 2,183,646, granted December 19, 1939, and may be briefly described as follows: The currents from the current transformers 6 are passed through a phase sequence network or current filter 8 which produces a single-phase voltage at its terminals 9 and 10. The particular network shown is arranged to respond to the positive sequence and zero sequence components of the line currents, but has a weighted response to one of these, preferably the zero sequence component, so that the single-phase voltage produced at the terminals is proportional to the positive sequence component plus a constant times the zero sequence component of the line currents. For a full description of the design and operation of this and similar networks, reference should be made to the patent mentioned above. The terminals 9 and 10 are connected in a series circuit through a rectifier 11, polarized relay 12, insulating transformer 13 and pilot wires 14 to a similar circuit at the opposite end of the line section.

Under normal load or through fault conditions, the voltages across the terminals 9 and 10 are equal and opposite at the two ends of the line section and no current flows through the pilot wires or the rectifier. In case of an internal fault within the line section 1, however, the current filter voltages at opposite ends of the section will no longer be equal, and a current will flow through the pilot wires 14 and rectifier 11, causing a direct current to flow through the polarized relay 12 so that it closes its contacts and completes the circuit of the circuit breaker trip coil 5. A similar action takes place at the other end and both breakers will be tripped simultaneously. It is to be understood that, while a balanced voltage relaying system has been shown for the purpose of illustration, the supervising arrangement of my invention can be used with any type of relaying system in which pilot wires are utilized for the purpose of effecting a comparison between current or voltage conditions at opposite ends of a transmission line section or other electrical instrumentality to be protected, or for transmitting an impulse to operate an auxiliary relay.

It will be obvious that the successful operation of such a relaying system depends on the reliability of the pilot wires, and that in case of a fault on the pilot wires, the system will become inoperative. I therefore provide supervising means to prevent failure of the relaying system as a result of failure of the pilot wires. The supervising system consists of an audio-frequency transmitter 15, having a control switch 17, and an audio-frequency amplifier and receiver 18. These units may be of any suitable or conventional construction and need not be described in detail. Any suitable means may be used for supplying plate and filament voltages to these units, and this may be conveniently done, as shown on the drawing, by using a conventional rectifier unit or power pack 19, connected to a reliable source of alternating current 20. Similar equipment is provided at the opposite end of the line section.

The transmitter 15 is connected across the pilot wires on the low-voltage side of the insulating transformer 13 through conductors 21 and coupling capacitors 22, and the receiver 18 is similarly connected across the pilot wires by conductors 23. An audio-frequency choke coil 24 having a low impedance to the fundamental power frequency is connected in series with the pilot wires to exclude the currents superimposed on the pilot wires by the transmitters 15 from the low-voltage relay circuits. A relay 25 having two sets of contacts 26 and 27 is normally energized by the receiver 18, and preferably has its operating coil connected in the plate circuit of the detector tube of this unit. This relay is arranged to hold its contacts open when it is energized. The transmitter 15 continuously generates current of a definite frequency which is superimposed on the pilot wires, and is normally received by the receiver 18 at the opposite end of the line section. The transmitters 15 at opposite ends of the line section generate currents of different frequencies, while the receiver 18 at each end of the section is tuned to receive the frequency generated by the transmitter at the opposite end.

Thus, in operation with the pilot wires intact, the receiver 18 at each end of the line section maintains its relay 25 energized, so that its contacts 26 and 27 remain open. In the event of failure of the pilot wires, either by open circuiting or short circuiting, the receiver 18 will no longer receive the current from the transmitter at the opposite end of the section, and the relay 25 will be deenergized, causing it to close its contacts. Closing of the contacts 27 completes a circuit through an alarm device 28, which may be either a visual or an audible signal or a combination of both, thus giving the operator a warning of the trouble and permitting him to correct the difficulty or to acknowledge the warning. The alarm may be interrupted by a switch 29. At the same time, the closing of the contacts 26 completes a circuit through conductors 30 connecting an impedance 31 across the terminals of the relaying circuit 7, so that it will function as a fault detector relay which operates to trip the circuit breaker in response to overcurrent in the line 1.

Closing of the contacts of the relay 25 may be utilized to complete circuit connections for effecting any type or types of response desired in the event of failure of the pilot wires. Such types of response may include the actuation of an alarm means or a change in the connections of the relaying circuit to alter its characteristics in any desired manner. Thus, it may be made to respond to overcurrent, as described above, with either the same or a different setting than during normal operation, or in some cases the relay circuit can be entirely disconnected if adequate back-up protection is provided. In general, any desired change in the relay characteristics may be effected in response to deenergization of the relay 25 to make the system operate in a desired manner in the event of failure of the pilot wires. It will be understood, of course, that either the alarm means or the change in connections of the relaying circuit may be utilized alone, or that both may be utilized together as described above. It will be seen, therefore, that the operation of this system can be made similar to that of the direct-current pilot wire relaying systems described above, but that it has all the advantages of the simpler alternating-current systems. It will also be seen that all equipment is connected on the low-voltage side of the insulating transformers, thus taking full advantage of their desirable characteristics in insulating the pilot wires from all relay equipment.

The invention has been described in connection with a particular type of relaying system but it is to be understood that its usefulness is not limited to this particular system, since it is of general application for the supervision of the pilot wires of any pilot wire relaying system, or for any similar auxiliary circuit where it is important to know that the circuit is in operative condition at all times or where it is desired to give an alarm or to effect a change in the terminal connections in case of failure of the circuit.

Although a particular embodiment of the invention has been illustrated and described, it is to be understood that it is not limited to the particular arrangement shown, but that, in its broadest aspect, it includes all equivalent embodiments and modifications which come within the scope of the appended claim.

I claim as my invention:

In a protective relaying system for an electrical transmission line, relaying circuits at each end of a protected section of said line, line circuit breakers at each end of said protected section controlled by said relaying circuits, pilot wires connecting said relaying circuits, said pilot wires extending for the length of the protected line section and being connected to the relaying circuits at each end of the section through insulating transformers, transmitting means and receiving means at each end of the protected line section, the transmitting means and receiving means at each end of the section being connected to the pilot wires on the low voltage side of the insulating transformer at that end, the transmitting means being adapted to superimpose relatively high frequency currents on the pilot wires, the transmitting means at opposite ends of the protected line section generating currents of different frequencies, and the receiving means at each end of the section being tuned to the frequency of the transmitting means at the opposite end, means at each end of the pilot wires for excluding said high frequency currents from the relaying circuit at that end, and a relay at each end of the protected line section energized from the receiving means at that end, said relay being operative to complete circuit connections for effecting a change in the characteristics of the relaying circuit at that end of the line section when it is deenergized as a result of interruption of the high frequency current transmitted from the other end of the section, said change in characteristics of the relaying circuit rendering it operative to trip the line circuit breaker at that end of the line section upon the occurrence of an abnormal condition on the line in the absence of any connection with the relaying circuit at the other end of the line section.

EDWIN L. HARDER.